United States Patent [19]

Gyllenspetz et al.

[11] E Re. 29,749

[45] Reissued Aug. 29, 1978

[54] TRIVALENT CHROMIUM ELECTROPLATING BATHS AND ELECTROPLATING THEREFROM

[75] Inventors: Jeffrey Gyllenspetz, Knaresborough; Stanley Renton, Penkridge, both of England

[73] Assignee: Albright & Wilson Ltd., Oldbury, England

[21] Appl. No.: 827,958

[22] Filed: Aug. 26, 1977

Related U.S. Patent Documents

Reissue of:

[64] Patent No.: 3,954,574
Issued: May 4, 1976
Appl. No.: 530,158
Filed: Dec. 6, 1974

[30] Foreign Application Priority Data

Jun. 17, 1974 [GB] United Kingdom ..... 2665/74
Dec. 13, 1973 [GB] United Kingdom ..... 57872/73

[51] Int. Cl.[2] ..... C25D 3/06; C25D 3/56

[52] U.S. Cl. ..... 204/43 T; 204/43 R; 204/51

[58] Field of Search ..... 204/51, 43 R, 43 T, 204/105 R, 123

[56] References Cited

U.S. PATENT DOCUMENTS

| | | | |
|---|---|---|---|
| 2,927,066 | 3/1960 | Schaer | 204/43 R |
| 3,706,638 | 12/1972 | Bride | 204/51 |
| 3,706,643 | 12/1972 | Huba | 204/51 |
| 3,729,392 | 4/1973 | Bride | 204/51 |
| 3,788,957 | 1/1974 | Christie et al. | 204/51 |
| 3,833,485 | 9/1974 | Crowther et al. | 204/43 R |

*Primary Examiner*—G. L. Kaplan
*Attorney, Agent, or Firm*—Flynn & Frishauf

[57] ABSTRACT

It is known to attempt to plate chromium from a solution containing trivalent chromium salts and organic complexants. The invention provides an aqueous chromium electroplating system containing trivalent chromium, together with both a formate or acetate and a bromide. Optionally the solution also contains ammonium, borate, chloride, sulphate and alkali metal ions and a wetting agent. The invention has the advantage of providing a solution with commercially acceptable covering and throwing power whose effluent can easily be purified to acceptable standards.

30 Claims, No Drawings

TRIVALENT CHROMIUM ELECTROPLATING BATHS AND ELECTROPLATING THEREFROM

Matter enclosed in heavy brackets [ ] appears in the original patent but forms no part of this reissue specification; matter printed in italics indicates the additions made by reissue.

This invention relates to the electrodeposition of chromium from aqueous solutions of trivalent chromium salts.

Chromium electrodeposits have long been valued for their decorative appearance, strength and resistance to corrosion. However, of all the metals which are widely used in the electroplating industry, chromium is anomalous in that it is not possible, readily, to plate it from solutions of simple chromium salts.

Hitherto all commercial chromium plating has been carried out from solutions of hexavalent chromium, e.g., chromic acid plus catalyst. Owing to the toxicity of the spray produced and the unacceptability of hexavalent chromium to sewage or river authorities, it has been necessary to use expensive mist suppresants and to reduce Cr VI to Cr III before discharge, usually using sulphur dioxide. Moreover, due to the positive slope of the current density/plating thickness curve, more metal is deposited on high current density areas such as edges than is necessary for protection and, in certain cases, the fault called 'burning' appears (burning is deposition of Cr in a non-decorative, roughened, and non-bright form caused by excessive deposition rates).

For nearly a hundred years, therefore, numerous attempts have been made to develop an economically acceptable process for plating from solutions of trivalent and/or divalent chromium. Despite frequent claims to the contrary, especially in the patent literature, all these attemps have proved unacceptable in commercial practice. Systems for plating from trivalent chromium which have been proposed so far have had serious disadvantages such as inadequate covering or throwing power, instability or an effluent which is too difficult or costly to purify to the level required by sewage or water authorities.

A commercially acceptable plating solution must provide a more or less even deposit over the whole workpiece.

In practice the current density varies across the surface of the workpiece (e.g., between 5 and 1000 amps $ft^{-2}$. The ability of a plating solution to produce bright deposits over a range of current density is called its covering power, the ability to deposit metal of even thickness at different current densities is called throwing power.

Conventional plating solutions based on hexavalent chromium have a covering power of about 5 to 800 amps $ft^{-2}$ and a rather poor throwing power as illustrated by the occurrence of burning at high current densities.

Most trivalent chromium plating solutions which have been proposed hitherto have failed to provide sufficient covering or throwing power. For example, simple inorganic solutions, e.g., chloride or sulphate, show the characteristic of increasing deposition rate with increasing current density, leading to burning at high current density areas and inability to plate into recessed areas unless the average current density is increased to a level at which unacceptable burning occurs on prominences. To overcome these disadvantages it has been proposed to form complexes (see for example U.S. Pat. No. 3,706,636).

One of the difficulties when using a complex of chromium, however, whether organic or inorganic in nature, is to achieve a complex which is stable and at the same time bound loosely enough to permit plating, and to enable chromium to be precipitated from rinse waters sufficiently readily to permit economic purification of the effluent. The solutions proposed in the prior art have always failed to fulfil one or more of the above conditions. Other practical difficulties such as low conductivity and generation of noxious anode products have also been found in certain cases.

We have now discovered a novel chromium electroplating solution which overcomes at least some of the foregoing difficulties, and which comprises (a) trivalent chromium, (b) formate or acetate and (c) bromide wherein the proportion of bromide may, for example be in the range 1 : 1 to 1 : 10 molar based on chromium. The solutions preferably contain ammonium and preferably also borate.

Our invention provides, according to one aspect, an aqueous solution containing: 0.1 to 1.2 molar trivalent chromium; at least 0.01 molar bromide; formate or acetate in a molar ratio of from 3 : 1 to 0.5 : 1 based on the chromium; at least 0.1 molar ammonium and at least 0.1 molar borate.

The solutions of our invention may optionally contain soluble amounts of other metallic ions which are co-depositable with chromium to form alloys, such as iron, nickel, cobalt, manganese or tungsten. Preferably the solutions contain up to about 6 molar of conductivity salts. Preferably the pH of the solution is from 1 to 4.

The solution may contain bromide, formate (or acetate) and any borate ion which may be present, as the sole anion species, but such solutions are undesirably expensive. Preferably, therefore, the solution contains only sufficient bromide to prevent substantial formation of hexavalent chromium, sufficient formate to be effective in complexing the chromium; and sufficient borate to be effective as a buffer, the remainder of the anions required to balance the cation content of the solution comprising cheaper species such as chloride and/or sulphate.

For example the solution optionally and preferably contains halide ions, in addition to bromide such as fluoride or, preferably, chloride. The total amount of halide including the bromide and any iodide which may be present as well as any fluoride, and/or chloride, may optionally be sufficient, together with the formate and any borate to provide essentially the total anion content of the solution. The latter is determined by the number of equivalents of cation (including hydrogen ion) and is typically from 3 to 4 molar. Alternatively, and preferably, there may additionally be present some sulphate ion. Preferably the sulphate is present in a minor proportion based on the halide and most preferably a minor proportion based on the chloride and/or fluoride. Alternatively the sulphate may comprise a major proportion of the inorganic ion and, less preferably, may be present in place of chloride and fluoride. Preferably the solution also contains the cations of the conductivity salts, and of any salts used to introduce the anion species, which cations may for example be alkali metals, preferably sodium or potassium or metals such as calcium or magnesium.

The solutions of our invention may additionally contain minor, compatible amounts of additives, such as wetting agents (e.g., alkali metal alkyl benzene sulphonates) or antifoams which are commonly used in plating technology.

Our novel solutions therefore comprise at least some of the following species:

A. TRIVALENT CHROMIUM

This is an essential ingredient of the solutions of the invention. Proportions of less than 0.1 molar or more than 1.2 molar trivalent chromium result in significant loss of covering power, and the concentration should therefore be maintained within these limits, and preferably between 0.2 and 0.6 molar. Preferably the solution is substantially free from hexavalent chromium, and preferably the chromium in the solution is substantially all present as trivalent chromium before plating.

B. BROMIDE

This is an essential ingredient. The concentration of bromide should be maintained above 0.01 molar, to avoid formation of hexavalent chromium, and lowering of the plating rate. The maximum concentration is not critical but, is typically less than 4 molar and preferably less than 1 molar. The preferred range is from 0.05 to 0.3 molar. Iodide functions in a similar fashion to bromide, but suffers the disadvantage that free iodine, which would be formed during plating is only soluble to the extent of 0.03% w/w in water compared with 4% for bromine. Consequently attempts to use iodide in place of bromide lead to unacceptable precipitation of iodine. Iodide is, moreover, too expensive to use economically in place of bromide. However it is possible, in principle, to replace a minor part of the bromide with iodide, and references herein to bromide do not exclude bromide containing traces of iodide.

C. FORMATE AND/OR ACETATE

This is essential ingredient, formate being preferred. Typically the proportion of formate or acetate to chromium should not exceed 3 : 1 on a molar basis, to avoid unacceptedly severe precipitation of the corresponding chromium salt. If the proportion is less than 0.5 : 1 the covering power is undesirably reduced. Preferably the proportion of formate and acetate to chromium is between 2 : 1 and 1 : 1.

D. AMMONIUM

The presence of ammonium is important for at least the preferred embodiment of our invention. Generally if the concentration of ammonium is less than 0.1 molar there is a risk of forming hexavalent chromium. The upper limit is not critical and ammonium may be present in amounts up to saturation, i.e., about 4 molar. Preferably the ammonium is present in a concentration of from 1 to 3 molar. Ammonium is preferably present as $NH_4^+$ itself, but it is also possible although less preferred, within the scope of this invention to use substituted ammonium such as hydroxylammonium, hydrazonium or alkylammonium. Preferably arylammonium or heterocyclic ions such as pyridinium are absent since they tend to inhibit deposition of chromium.

E. BORATE

Although it is possible to plate chromium from solutions of our invention which do not contain borate, we have not been able to obtain what we consider fully satisfactory results, commercially, in the absence of borate. Concentrations below 0.1 molar result in undesirably low covering power. The upper limit is not critical, but generally we prefer to employ from 0.5 to 1 molar borate. The function of the borate is obscure. Its beneficial effects may be in part due to its buffering action. However, other buffer salts, such as phosphates and citrates appear relatively ineffective.

F. CONDUCTIVITY SALTS

These are optional but preferred. The concentration is not critical and may vary between 0 and about 6 molar according to solubility. Conductivity salts is a term used in the plating art to denote certain readily ionisable salts which may be added to plating baths to increase their electrical conductivity and so reduce the amount of power dissipated in the bath. Typically they are alkali metal or alkaline earth metal salts of strong acids, which are soluble in the solution. They should have a dissociation constant at least equal to $10^{-2}$. Typical examples are the chlorides and sulphates of sodium and potassium.

G. HYDROGEN ION

Best results are obtained when the bath is somewhat acidic. At low pH values (below 2) there is some loss of covering power which becomes unacceptable below pH 1. If the pH is above 4 the rate of plating tends to be undesirably slow. Optimum pH is between 2 and 3.5.

H. CHLORIDE AND/OR FLUORIDE

This is optional, but in the case of chloride, preferred. The amount is not, however, critical. It may vary from zero up to the maximum permitted by solubility considerations. Chloride is generally introduced into the bath as the anion of the conductivity salt (e.g., sodium chloride), as ammonium chloride, which is a convenient means of introducing the ammonia requirement of the bath, as chromic chloride which may optionally be used to supply at least part of the chromium requirement, and/or as hydrochloric acid, which is a convenient means of adjusting the pH of the bath. Preferably the chloride content is at least 0.5 molar most preferably at least 1 molar, e.g., 1.5 to 5 molar. A particularly convenient range is 2 to 3.5 molar.

I. SULPHATE

Is an optional but preferred ingredient. The amount of sulphate is not critical and may, like that of the chloride, vary between zero and maximum amount which is compatible with the solution. In one type of bath, particularly preferred, the amount of sulphate is less than the total halide, and preferably less than the total chloride. In a different type of bath, however, the proportion of sulphate is greater than the proportion of halide, and may be the predominant anion in the bath. Like the chloride the sulphate may be introduced into the bath as the anion of the conductivity salt, or of the ammonium or chromium salts or as sulphuric acid. Typical sulphate concentrations may be between 0 and 5 molar preferably 0.5 to 4, e.g., 0.6 to 3, most preferably 0.6 to 1.2 molar. Preferably the combined chloride and sulphate concentrations are at least 1 molar, e.g., at least 2 molar most preferably from 2.5 to 3.5 molar.

J. CO-DEPOSITABLE [METALS] *METAL*

[These are] *Iron may be present as an* optional [ingredients] *ingredient* of the bath [which may be present] when it is desired to plate chromium alloys. [Examples include iron, cobalt, nickel, manganese and tungsten. They] *It* may be present in the bath in any amount from zero to saturation, depending upon the desired composition of the alloy to be plated. [They are]*It is* normally introduced as [their] *its* soluble [chlorides] *chloride* or [sulphates] *sulphate.*

K. NON-CO-DEPOSITABLE METALS

These are optionally present. They may include alkali metals such as sodium, potassium or lithium, alkaline earth metals such as calcium or magnesium or other metal ions which will not plate out of the solution with the chromium. The amount of such metals is not critical provided that they do not precipitate in the presence of the other components. They are generally present incidentally, as the cation species of the conductivity salt, or of the borate, formate and/or bromide salts which may be used to provide those anion species in the solution.

L. SURFACE ACTIVE AGENTS

These are optionally but preferably present in effective and compatible amounts. Wetting agents and antifoams are used throughout plating technology and many suitable examples are well known to those skilled in the art. Any of the wetting agents commonly used in hexavalent chromium plating may be used in the present invention. However, since the solutions of the present invention are much less strongly oxidizing than hexavalent chromium solutions it is also possible, and preferred, to use the cheaper wetting agents commonly employed in the less aggressive types of plating solution. The principal restriction on the effectiveness of the wetting agents arises from the presence of free bromine in the solution. Surfactants which are liable to bromination are therefore not recommended, e.g., most nonionic surfactants. The surfactants used according to our invention are typically cationic or preferably anionic, e.g., sulphosuccinates, alkyl benzene sulphonates having from 8 to 20 aliphatic carbon atoms, such as sodium dodecyl benzene sulphonate, alkyl sulphates having from 8 to 20 carbon atoms such as sodium lauryl sulphate and alkyl ether sulphates such as sodium lauryl polyethoxy sulphates. If the solution has undesirable foaming tendencies it is also possible, optionally, to include compatible antifoams, e.g., fatty alcohols such as octyl alcohol. The choice of surfactants for use in our solution is a routine matter easily within the ordinary competence of those skilled in the art. The amount of wetting agent used is in accordance with normal practice, e.g., 0.1 to 10 parts per thousand.

It is preferred that the solutions of our invention should consist essentially of the foregoing species. However we not not exclude the presence of minor amounts of other species which are compatible with the solutions and which do not adversely affect the plating properties to a material extent. Generally it is preferred that nitrate ion be substantially absent, since it tends to inhibit deposition of chromium, but other special, organic or inorganic, which do not inhibit plating of the chromium or materially reduce covering power or create unacceptable problems of toxicity, may optionally be present. Whether any particular species can be tolerated in the solution may be routinely determined by simple testing.

The bath may conveniently be made up by dissolving water soluble salts of the required species in water in an amount sufficient to provide the desired concentration. Typical salts which may be used include chromic chloride, chromic sulphate, potassium bromide, sodium bromide, ammonium bromide, potassium formate, sodium borate, ammonium chloride, ammonium sulphate and sodium chloride.

The cationic species may, if desired be added wholly or partly as bases such as, for example, aqueous ammonia. A particularly convenient form of chromium is basic chromium sulphate, which is commercially available in chrome tanning liquors. For example a 33% basic chromium sulphate, obtained by reducing sodium dichromate with sulphur dioxide is a common article of commerce, and a particular advantage of the invention is that it is possible to use such relatively cheap and readily available sources of chromium. However we do not exclude the use of salts such as chromium formate or acetate.

The anion species may be added, at least in part as acids, e.g., hydrochloric, sulphuric, boric, formic or acetic acids. Preferably, when the essential species have been dissolved, the pH may be adjusted by addition of, for example, hydrochloric or sulphuric acid, or of, for example, ammonium, sodium or potassium, hydroxide. Preferably the pH is initially adjusted in the upper part of the preferred range, e.g., 2.5 to 4. In use the pH tends to fall and should be maintained, by occasional adjustments, in the range 2.5 to 3.5.

The bath may be prepared at room temperature, in which case plating should preferably be commenced within about 30 minutes of adding the last ingredient (usually the chromium salt) to the bath. Alternatively the bath may be prepared at elevated temperature (e.g., 70° C) and allowed to cool. Typically cooling may take from 10 to 24 hours. Cooling is preferably followed by plating out for about 10 ampere hours/liter.

The solution is preferably used at temperatures between 15° and 30° C., e.g., 20° and 25° C. Current densities between 5 and 1000 amps $ft^{-2}$ (e.g., about 100 amps $ft^{-2}$) may be employed.

The system is useful for plating onto plastics and nonferrous (e.g., aluminum or zinc) substrates as well as more conventional ferrous or nickel substrates. Plating on plastics (usually ABS) is common with hexavalent chromium solutions. The procedures used are well known and are described for example in "Electroplating of Plastics" by William Goldie and in a paper presented to the Society of Automotive Engineers in January 1965 entitled "Electroplating of Plastics" by Sauvestre. Preferably we employ the same procedures as have hitherto been used for depositing hexavalent chromium on plastic, but substituting the solution of our invention for the hexavalent chromium solutions used hitherto.

It is preferred when electroplating from solutions of our invention to use inert anodes such as, for example, carbon anodes. Other inert anodes such as platinised titanium or platinum may be used but are more costly. Soluble chromium anodes are unsuitable due to the build up of hexavalent chromium. However for alloy plating it is possible to use, for example, ferrous metal or chrome/iron anodes.

The invention will be illustrated by the following examples:

EXAMPLE I

A solution was prepared by dissolving the following ingredients in water and then diluting the resultant solution to 1 liter.

| | | Molar quantities | |
|---|---|---|---|
| Chromic chloride | 140 ml of a solution containing 150 g/l Cr | 0.4 | Cr |
| Potassium formate | 80 g | 1.0 | HCOO- |
| Ammonium bromide | 10 g | 0.1 | Br |
| Potassium chloride | 76 g | 1.0 | KCl |
| Boric acid | 40 g | 0.66 | $H_3BO_3$ |
| Ammonium chloride | 54 g | 1.0 | $NH_4Cl$ |
| Proprietary Wetting agent | ml | | |

The wetting agent was a mixture of a sodium sulphosuccinate and a minor proportion of octyl alcohol, to reduce foaming.

The equilibrium pH of the solution after standing for 24 hours was 2.8.

After standing overnight, the solution was placed in a conventional Hull Cell furnished with circulatory cooling and plated using a carbon anode. The following results were obtained by plating for 3 minutes at a total current of 5 amps and a temperature of 25° C.

| | | | | | |
|---|---|---|---|---|---|
| Current density amps/sq ft (ASF) | 400 | 200 | 100 | 50 | 25 |
| Thickness of deposit in micro-ins | 18 | 15 | 17 | 13 | 5 |

The bright plating range extended to the high current density end of the panel and was estimated as having an upper value of at least 1000 ASF and the minimum deposition current density cut-off was measured as less than 5 ASF. After the passage of 20 AH/Liter, no deterioration in plating was noted and only a minor variation in pH was recorded.

Raising the pH of the used electrolyte to 8 by addition of alkali resulted in the chromium content of the electrolyte being immediately precipitated.

EXAMPLE II

A solution was prepared as in Ex. I by dissolving the following ingredients in water at laboratory temperature (20°–25° C) and diluting to 1 liter.

The chromium tanning liquor used in this experiment was a 33% basic liquor. This is an article of commerce used for tanning of leather and is made by reduction of sodium dichromate with sulphur dioxide. The reaction product has a 'basicity' of 33%, basicity being a measure of the replacement of sulphate by hydroxyl to give products of varying compositions. The liquor contained 130 g/l Cr.

| | | Approx. Molarity | |
|---|---|---|---|
| Chromium tanning liquor | 150 ml | 0.4 | Cr |
| Wetting agent | 1 ml | | |
| Ammonium chloride | 90 g | 1.7 | $NH_4Cl$ |
| Potassium chloride | 75 g | 1.0 | KCl |
| Ammonium bromide | 10 g | 0.1 | $NH_4Br$ |
| Boric acid | 50 g | 0.8 | $H_3BO_3$ |
| Ammonium formate | 55 g | 0.87 | HCOO |
| Sulphuric acid SG 1.84 | 2 ml | | |

The pH at makeup was 3.4 and plating with a carbon anode was commenced within 30 minutes at a volume current density of 0.5 amp/liter. After 1 hor plating (i.e., after 0.5 ampere hour per liter), a sample was taken for evaluation in a Hull Cell furnished with circulatory cooling to maintain temperature between 20°–25° C.

A current 10 amps was passed for 3 mins. using a carbon anode and the following distribution on the panel was recorded by standard coulometric thickness measurements.

| | | | | | |
|---|---|---|---|---|---|
| Current density (amps/sq. ft. ASF) | 400 | 200 | 100 | 50 | 25 |
| Thickness in microinches | 12 | 8 | 6 | 8 | 4 |

The plating range was estimated at 1000–8 ASF at the working pH of 3.0.

EXAMPLE III

A solution was prepared by dissolving the following ingredients in water and heating to 60° C, allowing to cool overnight and making up to 1 liter.

| | g | Approx. Molar | |
|---|---|---|---|
| Chromic fluoride | 42 | 0.4 | M |
| Potassium chloride | 50 | 0.7 | M |
| Ammonium chloride | 100 | 2 | M |
| Ammonium bromide | 10 | 0.1 | M |
| Boric acid | 50 | 0.8 | M |
| Sodium formate | 60 | 0.88 | M |

The plating range was estimated at 1000–30 ASF at pH 3.15.

EXAMPLE IV

A solution containing iron was prepared from a solution as described in Ex. 1 by adding 14 g ferrous chloride ($FeCl_2 4H_2O$). Similar plating tests carried out on a Hull Cell gave a deposit with a plating range of 10–800 ASF at pH 3.5. The deposit consisted of an iron chromium alloy containing 40–60% Fe + 60–40% Cr and was non-rusting in air.

EXAMPLE V

A zinc diecast lock plate was plated conventionally with copper and duplex nickel to BS 1224 Service Condition 3, and finished by plating with 25 millionths of an inch of chromium from the electrolyte of Ex. 1 at about 100 ASF. No special precautions were taken in jigging, and no 'burners' or other current-robbing devices were used. No difficulty was found in plating the whole surface without burning or loss of cover.

The deposit, when examined after overplating with copper as in BS 1224 Appendix E2, showed microcracking over the whole surface at a density of approx. 2000 cracks per inch, forming a closed network. The corrosion resistance of a similar sample exposed in a 'CASS' test (BS 1224 Appendix H) was good and fully equivalent to a proprietary microcracked chromium plated from a chromic acid based solution.

We claim:

1. An aqueous acidic chromium electroplating solution which consists essentially of (a) from 0.1 to 1.2 molar trivalent chromium, (b) carboxylate selected from formate and acetate in a proportion of from 3:1 to 0.5:1 molar based on chromium, (c) bromide in a molar ratio of bromide to chromium of from 1:1 to 1:10, and at least 0.1 molar ammonium.

2. The solution of claim 1 which additionally contains at least 0.1 molar borate.

3. The processes of electroplating chromium on a cathode comprising immersing an insoluble anode and a cathode in the aqueous chromium plating solution of claim 1, maintaining said solution at a pH between 1 and 4, and at a temperature between 15° and 30° C, and applying an electrical current between said anode and cathode in an amount such that the cathode current density is between about 5 and 1000 amps. per sq. foot, whereby chromium is electrodeposited on said cathode.

4. An aqueous acidic chromium plating solution consisting essentially of from 0.1 to 1.2 molar trivalent chromium; at least 0.01 molar bromide; formate in a molar ratio of formate to chromium from 3:1 to 0.5:1; at least 0.1 molar ammonium and at least 0.1 molar borate.

5. The solution of claim 4 wherein the concentration of chromium is from 0.2 to 0.6 molar.

6. The solution of claim 4 wherein the concentration of bromide is less than 1 molar.

7. The solution of claim 6 wherein the concentration of bromide is from 0.05 to 0.3 molar.

8. The solution of claim 4 wherein the concentration of formate is between 2:1 and 1:1 molar based on the concentration of chromium.

9. The solution of claim 4 wherein the concentration of ammonium is from 1 to 3 molar.

10. The solution of claim 4 wherein the concentration of borate is from 0.5 to 1 molar.

11. The solution of claim 4 containing up to 6 molar of conductivity salts.

12. The solution of claim 4 having a pH between 1 and 4.

13. The solution of claim 12 having a pH between 2 and 3.5.

14. The solution of claim 4 containing at least 0.5 molar of a halide selected from chloride and fluoride.

15. The solution of claim 14 containing from 1.5 to 5 molar chloride.

16. The solution of claim 4 containing up to 5 molar sulphate.

17. The solution of claim 16 containing from 0.5 to 4 molar sulphate.

18. The processes of electroplating chromium on a cathode comprising immersing an insoluble anode and a cathode in the aqueous chromium plating solution of claim 4, maintaining said solution at a pH between 1 and 4, and at a temperature between 15° and 30° C, and applying an electrical current between said anode and cathode in an amount such that the cathode current density is between about 5 and 1000 amps. per sq. foot, whereby chromium is electrodeposited on said cathode.

19. An aqueous acidic chromium electroplating solution consisting essentially of from 0.1 to 1.2 molar trivalent chromium: from 0.05 to 0.3 molar bromide; formate in a molar ratio of formate to chromium of from 2:1 to 1:1; from 1 to 3 molar ammonium; and from 0.5 to 1 molar borate.

20. The solution of claim 19 having a pH of from 1 to 4 and containing from 1.5 to 5 molar chloride and at least 0.5 molar sulphate the proportion of sulphate being smaller than the proportion of chloride.

21. The solution of claim 19 having a pH of from 1 to 4 and containing from 0.5 to 4 molar sulphate and at least 0.5 molar chloride the proportion of chloride being less than the proportion of sulphate.

22. The solution of claim 19 having a pH of from 1 to 4 and containing from 2.5 to 3.5 molar total of anion selected from chloride and sulphate.

23. The processes of electroplating chromium on a cathode comprising immersing an insoluble anode and a cahode in the aqueous chromium plating solution of claim [11] *19*, maintaining said solution at a pH between 1 and 4, and at a temperature between 15° and 30° C, and applying an electrical current between said anode and cathode in an amount such that the cathode current density is between about 5 and 1000 amps. per sq. foot, whereby chromium is electrodeposited on said cathode.

24. An aqueous chromium plating solution consisting essentially of water, from 0.2 to 0.6 molar trivalent chromium, from 0.05 to 0.3 molar bromide, formate in a molar ratio of formate to chromium of from 2:1 to 1:1, from 1 to 3 molar ammonium, from 0.5 to 1 molar borate, from 2.5 to 3.5 molar of anion selected from chloride and sulphate and having a pH between 1 and 4.

25. Solution of claim 24 containing from 0 to 6 molar alkali metal cation.

26. The solution of claim 25 containing an effective and compatible amount of a non-brominatable wetting agent.

[27. The solution of claim 26 containing up to saturation of a co-depositable metal cation selected from iron, cobalt, nickel, manganese and tungsten.]

28. The processes of electroplating chromium on a cathode comprising immersing an insoluble anode and a cathode in the aqueous chromium plating solution of claim [22] *24*, maintaining said solution at a pH between 1 and 4, and at a temperature between 15° and 30° C, and applying an electrical current between said anode and cathode in an amount such that the cathode current density is between about 5 and 1000 amps. per sq. foot, whereby chromium is electrodeposited on said cathode.

29. The process of claim 28 wherein said pH is between about 2 and 3.5; and said temperature is between about 20° and 25° C.

30. The process of claim 29 wherein said current density is about 100 amps. per sq. foot.

*31. An aqueous electroplating bath for electrodepositing chromium-iron alloys consisting essentially of water, from 0.2 to 0.6 molar trivalent chromium and iron cation in an amount up to saturation for the electrodeposition of chromium-iron alloys, from 0.05 to 0.3 molar bromide, formate in a molar ratio of formate to chromium of from 2:1 to 1:1, from 1 to 3 molar ammonium, from 0.5 to 1 molar borate, from 2.5 to 3.5 molar of anion selected from chloride and sulphate and having a pH between 1 and 4.*

* * * * *